United States Patent Office 3,357,498
Patented Dec. 12, 1967

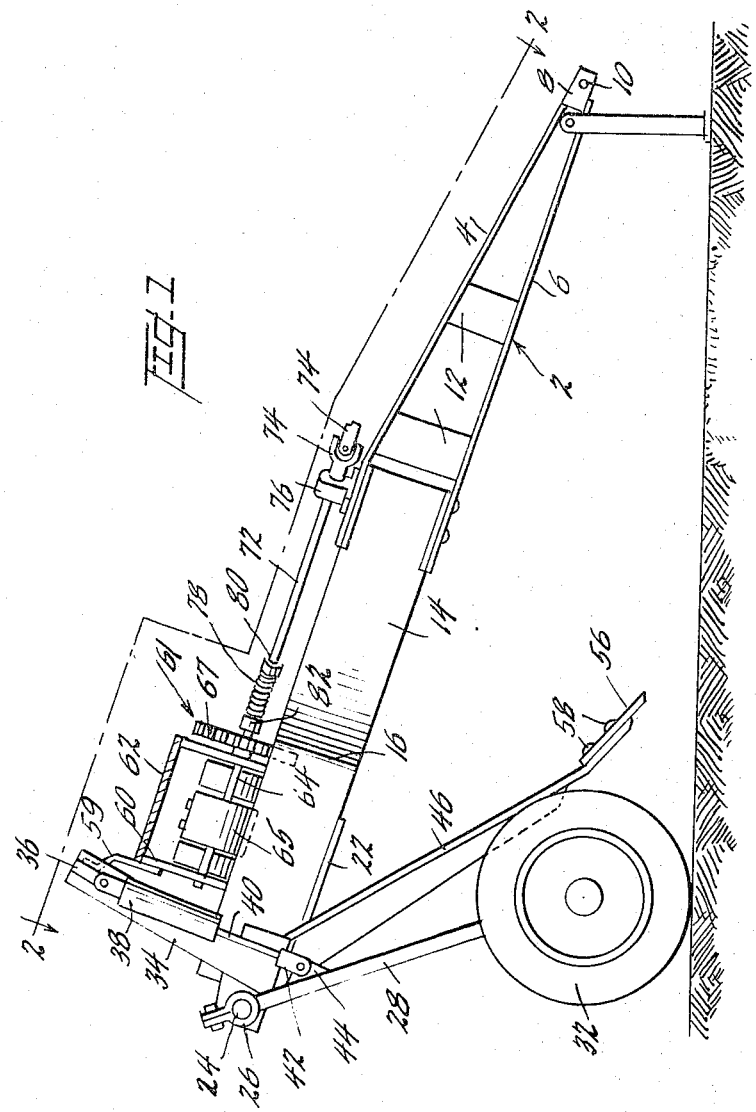

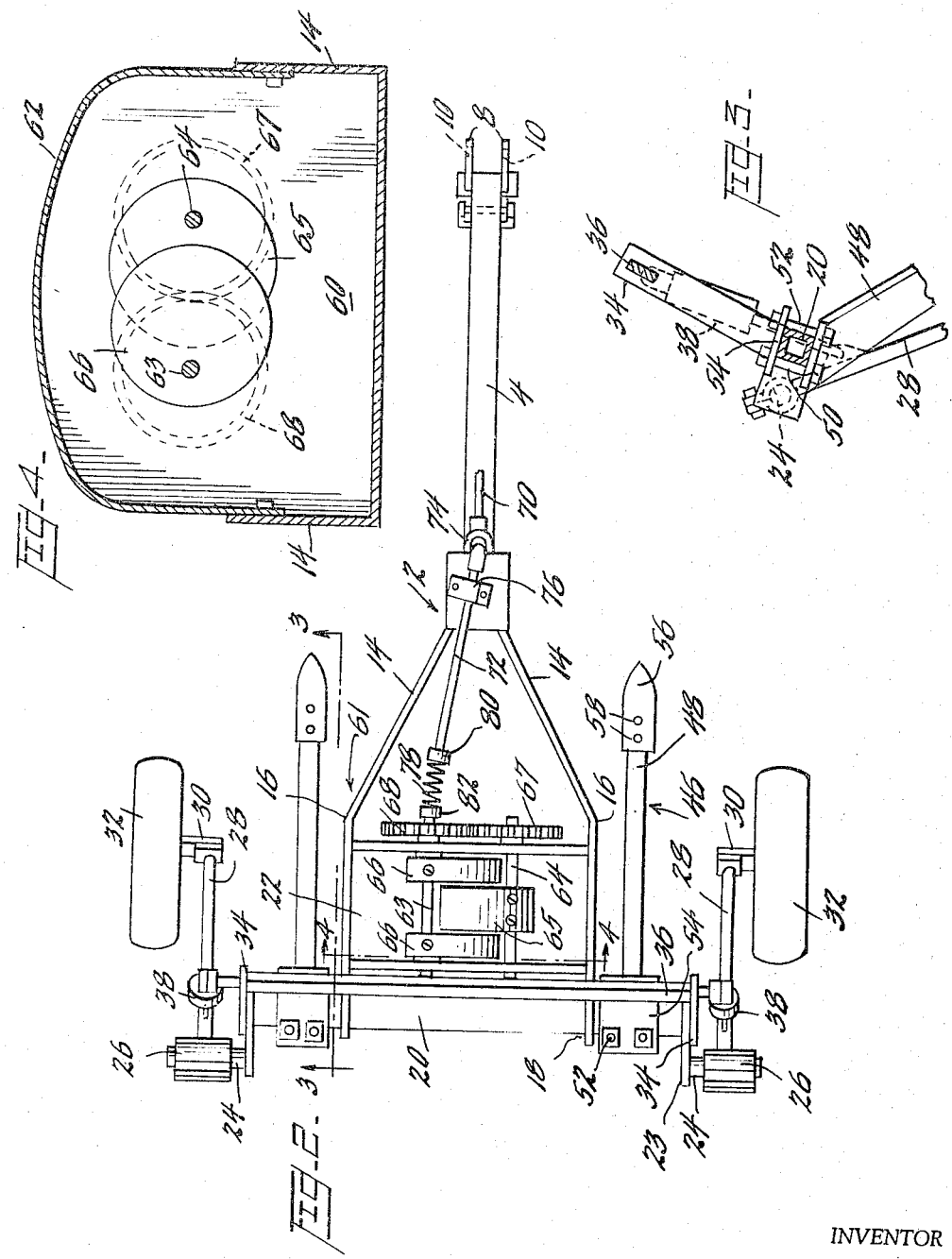

3,357,498
SOIL RIPPER
Rolland C. Higley, 610 Southlawn Ave.,
Artesia, N. Mex. 88210
Filed May 11, 1964, Ser. No. 366,321
15 Claims. (Cl. 172—40)

This invention relates to earth-working machines, and in particular to machines of the type with earth-cleaving tools adapted to be dragged along below the surface of the ground to break it up from its packed condition for various purposes such as aeration, weed-killing and the improvement of water-retention properties. The latter problem takes on an added prominence in the more arid regions requiring loosening of the soil to greater depths than normal. Since the power requirements increase markedly with depth of penetration of the soil the problem has been heretofore attended with practical limitations, especially in the case of small-scale operations.

It is therefore an object of the invention to provide an earth-working machine which will satisfactorily cleave and break up packed soils to depths greater than heretofore practicable, without undue increase in the power requirements. A further object is to improve the subdivision of packed soil by ground-penetrating, earth-working elements.

Attempts have been made heretofore to achieve objects of this general nature, and these have included the provision of a rotating, eccentric weight so located as to cause vibration of the earth-cleaving tool. However, such devices have been attended with certain shortcomings, including a lowered efficiency due to the distribution of the vibration throughout a complete range of 360°, which thus includes sidewise motion, as well as up-and-down, and components of motion intermediate these, and results in undue power consumption.

I have found that the ground-loosening process is materially improved by limiting the vibration of the tool in a single plane such as up-and-down, or side-by-side, and it is further an object of the invention to achieve such a result.

More particularly, I have found that this result is achieved in satisfactory measure by a pair of equivalent eccentrics, rotating in oposite directions, and the attainment of this result constitutes a still further object of the invention.

While the action of oppositely rotating eccentrics provides results which are superior to prior art devices, the system is capable of further improvement, due to the fact that the input shaft undergoes variation of rotational speed during each cycle, and it is yet another object to eliminate this effect. More particularly, it is an object to achieve constancy of rotation of the input shaft, by providing a torsionally resilient connection in the input system. In the specific form illustrated herein, this result is achieved by a coil-spring link in the input system.

For a more detailed description of the invention reference is made to the accompanying drawings, showing a preferred embodiment, in which:

FIGURE 1 is a side elevational view of the embodiment in a position of rest;

FIGURE 2 is a plan view of the embodiment of FIGURE 5, with the cover of the eccentric housing removed;

FIGURE 3 is a fragmentary view of a detail taken along the line 3—3 of FIGURE 2; and FIGURE 4 is a detail section along the line 4—4 of FIGURE 2.

In the embodiment of my invention disclosed in FIGURES 1 to 4 an elongated tapering frame 2 has a forward tongue made up of an upper plate 4 and a lower plate 6, reinforced by a pair of vertical plates 8 welded in box form. Plates 8 extend forwardly of plates 4 and 6 and have a pair of aligned holes 10, through which a pin may be passed to hitch the implement to a suitable draft appliance. The plates 4 and 6 diverge rearwardly to be joined to the deeper, main portion of frame 2. At suitable intermediate points, stiffening web elements 12 may be inserted.

The rear portion of the frame is made up of two side plates 14 bent at the lines 16 to form a rectangular main box, with a front portion tapering toward the tongue portion of the frame. At the rear, they are welded at 18 to a box-shaped cross member 20, while at the front, they are joined box-wise, by welding, to the rearmost portion of plates 4 and 6 to form a solid frame extending from front to rear. The rear portion of side plates 14 are connected together along the underside by plate 22.

The cross member 20 extends outwardly in each direction with end plates 23 carrying offset axle portions 24 supporting bearings 26, mounted on the carriage elements 28. These carriage elements end in a pair of fixtures 30 for mounting the wheels 32, by which the implement is transported.

Inwardly of bearings 26, are mounted a pair of columns 34 each being connected together by arbor bar 36. From each projecting end of the arbor bar 36, there is pivotally suspended the body 38 of an hydraulic power unit. Upon the outer end of each unit's rod 40 is a clevis 42 connected with an eye 44 welded to the carriage element 28. It will be seen that the rear portion of frame 2 may be raised with respect to the ground by means of the hydraulic power unit 38, because, as the rods 40 are thrust outwardly, they cause the wheels to swing away from and toward the rear of the implement. The implement may be lowered by retracting the rods 40 within the cylinders of units 38, causing the wheels to swing frontwardly and upwardly. For clarity, the source of the hydraulic fluid and its connection to the cylinders of units 38 has been omitted.

A pair of digging arms 46 are shown, each comprised of a tapering channel shank 48 having a base plate 50, at one end. By means of bolts 52 passing through the base plate and backing plate 54, the digging arm is secured to the box-like cross member 20. The location of the digging arms may be shifted or the number of digging arms changed, by reason of the bolt structure. However, it is usually most desirable to use only the two digging arms. Blades 56 are secured at the outer ends of the shanks by means of bolts 58.

A pair of plates 60 are welded between plates 14 and connected to plate 22 to form a housing 61 for the vibrating mechanism of the implement, and the rearmost plate is attached by a strap 61 to bar 36. To complete the housing, a cover 62 is conformed to the rounded upper portion of plates 60, and is riveted to side plates 14.

End plates 60 of housing 61 are suitably bored to journal a pair of parallel shafts 63, 64, located at the same level, the latter carrying a single, centrally located eccentric weight 65, and the former carrying a pair of identical eccentric weights 66, each weighing one-half as much as the single weight 65, and arranged to overlap the latter on each side thereof, during rotation. It is also possible to use two single weights, of identical mass, either side-by-side, and overlapping, or rotating in a common plane, in which latter case the shafts 63, 64 will be separated further than the distance shown.

In order to achieve the desired effects enumerated in the objects set forth hereinabove, it is necessary that the eccentric weights rotate in opposite directions, and to this end, shafts 63, 64 are provided with meshing, identical pinions 67, 68, which may be located outside of the housing 61.

The input to housing 61 comprises a shaft 70 connected to a suitable source of power in the towing vehicle, and leading to an angularly disposed shaft 72 through a universal coupling 74, shaft 72 being journalled in a pillow block 76 on the draft tongue.

Shaft 72 is oblique because it leads to shaft 63 of the eccentric box, and if the connection comprised an ordinary type of universal at this box, the action would be one of less than optimum efficiency, due to unnecessary expenditure of excess power in the vibration system, which results from a periodic variation in the speed of the shaft. In amelioration of this condition, I have provided a universal connection to the eccentric shaft, which comprises a helical coil spring 78, suitably anchored at one end to a collar 80 on oblique shaft 72, and at the other end to a collar 82 on shaft 63. With this arrangement there is a buffering effect which tends to cancel out the effects of variations in the rotational speed of the input shaft, which would introduce cyclic inertial effects, tending to absorb power.

While certain beneficial aspects of the torsionally resilient, universal coupling have been pointed out, it should be understood that the use of opposed eccentrics is superior to prior art devices, even without the resilient feature in the universal coupling.

A stand 84, pivoted at 86 to the plates 8, may be provided to support the implement in non-functional position. During operation of the implement, the stand may be held out of place against the plate 6.

In operation, with the appliance hitched to the towing vehicle, the tool-bearing platform is adjusted to the desired working position by operation of the hydraulic power units. As the towing vehicle moves forward the tool blades dig in to the ground in the usual manner. By a suitable clutching arrangement rotation is imparted to the takeoff shaft 70 with consequent rotation of shaft 72 and the eccentric rollers. Rotation of the offset weights results in a steady vibration of the tool platform of relatively high frequency which imparts to the tool blades energy impulses of considerable magnitude. These pulses perform a work function in the earth which is more efficient and complete than a straight drag of an otherwise inert tool. Not only does this result in a better job of breaking up the earth but it also eases the forward progress of the tools and thus reduces the power requirements on the towing vehicle by an amount greatly in excess of the additional power required in the vibratory action. The reduction in power requirement which has been observed to be at least as much as 70 percent, is eloquently illustrated by the observed fact that in actual operations, with the machine under heavy duty operations, a cutting off of the vibrator will immediately stall the towing vehicle.

While certain preferred embodiments have been shown and described, the invention is not limited thereto, since various modifications or equivalents will be readily apparent to those skilled in the art in the light of this disclosure, and the invention is not, therefore, to be deemed as limited except insofar as shall be inferrable from the spirit and scope of the appended claims.

I claim:

1. In an earth-working machine for movement across the earth to be worked and having ground cleaving tools, a vibrating mechanism in association with said tools comprising a pair of shafts arranged with their axes along the line of movement of the machine and in a plane generally parallel to the earth when in operation, said shafts carrying rotary, eccentric weights, and means to rotate said weights in opposite directions.

2. A device as in claim 1, said means comprising a pair of meshing gears on said pair of shafts, and a drive shaft coupled to one of said pair of shafts.

3. A device as in claim 2, the connection of said drive shaft to said one of said pair of shafts comprising a universal joint.

4. A device as in claim 2, the connection of said drive shaft to said one of said pair of shafts comprising a spring element.

5. A device as in claim 2, the connection of said drive shaft to said one of said pair of shafts comprising an element having spring characteristics in torsion.

6. A device as in claim 2, the connection of said drive shaft to said one of said pair of shafts comprising a coil spring, arranged to communicate the drive under torsion about its axis.

7. A device as in claim 2, the connection of said drive shaft to said one of said pair of shafts comprising a helical spring, arranged to communicate the drive under torsion about its axis.

8. A device as in claim 7, said weights being cylindrical.

9. A device as in claim 8, said weights comprising at least one weight on one of said pair of shafts, and at least two weights on the other of said pair of shafts, on opposite sides of said one weight.

10. A device as in claim 9, the total mass of said pair of weights equaling that of said one weight.

11. A device as in claim 10, said pair of weights overlapping said one weight, sidewise, and said weights meshing during rotation.

12. A device as in claim 1, said weights being cylindrical.

13. A device as in claim 12, said weights comprising one weight centrally located on one of said pair of shafts, and a pair of weights on the other of said pair of shafts, on opposite sides of said one weight.

14. A device as in claim 13, the total mass of said pair of weights equaling that of said one weight.

15. A device as in claim 14, said pair of weights overlapping said one weight, sidewise, and said weights meshing during rotation.

References Cited

UNITED STATES PATENTS

| | | | |
|---|---|---|---|
| Re. 20,663 | 3/1938 | Cameron | 172—40 |
| 2,514,394 | 7/1950 | Irving. | |
| 2,897,734 | 8/1959 | Bodine | 94—48 X |
| 1,844,124 | 2/1932 | Jordan | 172—699 XR |
| 2,545,111 | 3/1951 | Schaubert | 172—413 |
| 2,597,608 | 5/1952 | Altgelt et al. | 172—699 |
| 2,766,629 | 10/1956 | Booth | 94—48 |
| 2,828,676 | 4/1958 | Steuerman | 94—48 |
| 3,103,250 | 9/1963 | Lamb | 172—40 |
| 3,183,979 | 5/1965 | Rogers | 172—40 |

FOREIGN PATENTS

| | | |
|---|---|---|
| 43,610 | 1/1961 | Poland. |

ABRAHAM G. STONE, Primary Examiner.

ANTONIO F. GUIDA, Examiner.

F. B. HENRY, R. L. HOLLISTER, Assistant Examiners.